(12) United States Patent
Scotchmer

(10) Patent No.: US 10,391,579 B2
(45) Date of Patent: Aug. 27, 2019

(54) VENTILATED VIBRATING ELECTRODE HOLDER

(71) Applicant: HUYS INDUSTRIES LIMITED, Weston (CA)

(72) Inventor: Nigel Scotchmer, Willowdale (CA)

(73) Assignee: HUYS INDUSTRIES LIMITED (CA)

( * ) Notice: Subject to any disclaimer, the term of this patent is extended or adjusted under 35 U.S.C. 154(b) by 718 days.

(21) Appl. No.: 14/776,615

(22) PCT Filed: Mar. 13, 2014

(86) PCT No.: PCT/CA2014/000219
§ 371 (c)(1),
(2) Date: Sep. 14, 2015

(87) PCT Pub. No.: WO2014/138891
PCT Pub. Date: Sep. 18, 2014

(65) Prior Publication Data
US 2016/0045973 A1 Feb. 18, 2016

Related U.S. Application Data

(60) Provisional application No. 61/787,410, filed on Mar. 15, 2013.

(51) Int. Cl.
*B23K 9/30* (2006.01)
*B23K 9/28* (2006.01)
(Continued)

(52) U.S. Cl.
CPC .................. *B23K 9/30* (2013.01); *B23K 9/28* (2013.01); *B23K 9/285* (2013.01); *B23K 9/325* (2013.01);
(Continued)

(58) Field of Classification Search
CPC ............ B23K 9/30; B23K 9/28; B23K 9/285
(Continued)

(56) References Cited

U.S. PATENT DOCUMENTS 2,526,035 A  10/1950  Miller
3,662,148 A * 5/1972  Blosser .................... B23K 9/30
                                                      219/136
(Continued)

FOREIGN PATENT DOCUMENTS

GB          2223919 A  *  4/1990  ............... B23K 9/28

OTHER PUBLICATIONS

International Search Report dated Jun. 10, 2014 issued in corresponding International patent application No. PCT/CA2014/000219.

*Primary Examiner* — Dana Ross
*Assistant Examiner* — Ayub A Maye
(74) *Attorney, Agent, or Firm* — Ostrolenk Faber LLP

(57) ABSTRACT

A welding electrode is mounted in a tool holder that is part of a handle apparatus. The handle apparatus has an electrode power connection. The handle apparatus has a housing defining a haft that can be grasped in the hand of an operator. A vibrator is mounted inside the haft. The vibrator includes a force transmitter in the form of a cantilevered beam. The cantilevered beam is electrically conductive and carries power to the tool holder. The tool holder has a handle that permits the welding rod to be rotated about its axis as it wears during deposition of welding rod material on the object work piece.

18 Claims, 13 Drawing Sheets

(51) Int. Cl.
  *B23K 9/32* (2006.01)
  *B23K 20/10* (2006.01)
  *B23K 103/04* (2006.01)
  *B23K 103/10* (2006.01)

(52) U.S. Cl.
  CPC .......... *B23K 20/10* (2013.01); *B23K 2103/04* (2018.08); *B23K 2103/05* (2018.08); *B23K 2103/10* (2018.08)

(58) Field of Classification Search
  USPC .................. 219/136, 138.119, 121.33, 120
  See application file for complete search history.

(56) References Cited

U.S. PATENT DOCUMENTS

| | | | | |
|---|---|---|---|---|
| 3,763,343 A | | 10/1973 | Bertrand | |
| 3,845,271 A | * | 10/1974 | Hirano | B23K 9/30 219/125.12 |
| 3,939,321 A | | 2/1976 | Rocklin | |
| 4,614,857 A | * | 9/1986 | Webb | B23K 9/0738 219/136 |
| 4,866,237 A | * | 9/1989 | Inoue | B23K 11/0013 219/76.13 |
| 4,873,412 A | * | 10/1989 | Vinczer | B23K 11/0053 219/136 |
| 5,448,035 A | * | 9/1995 | Thutt | B26B 9/00 219/76.13 |
| 5,541,382 A | * | 7/1996 | Taylor | B23K 11/12 219/117.1 |
| 5,947,364 A | * | 9/1999 | Tamura | B23K 20/106 156/580.2 |
| 7,358,458 B2 | * | 4/2008 | Daniel | B23K 9/0956 219/130.01 |
| 2005/0072762 A1 | * | 4/2005 | Delgado | B23K 9/285 219/75 |
| 2009/0161212 A1 | * | 6/2009 | Gough | B23K 9/167 359/462 |
| 2011/0042356 A1 | | 2/2011 | Leung et al. | |
| 2012/0152909 A1 | * | 6/2012 | Hung | B23K 9/167 219/74 |

\* cited by examiner

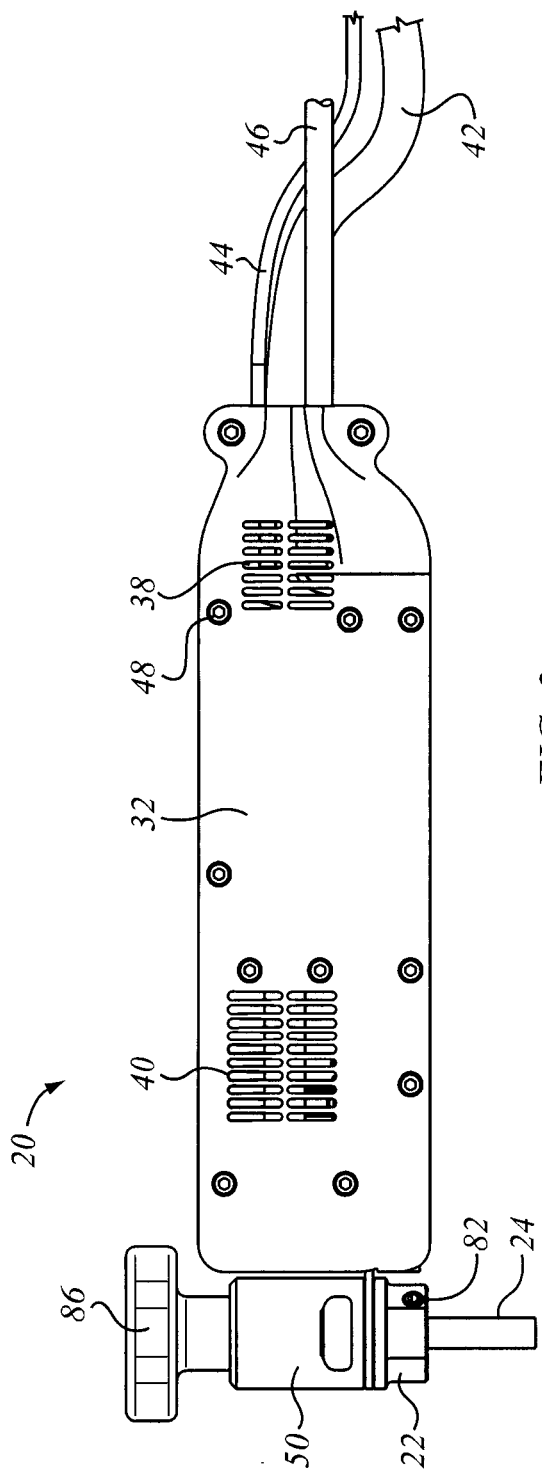
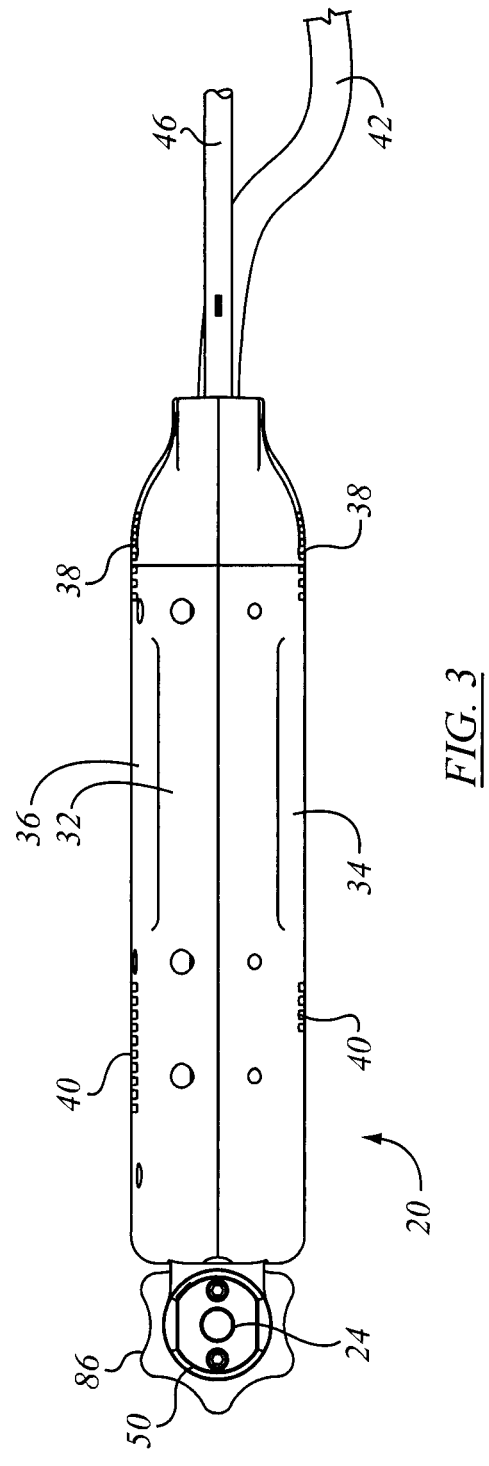
FIG. 2
FIG. 3

VENTILATED VIBRATING ELECTRODE HOLDER

CROSS REFERENCE TO RELATED APPLICATIONS

The present application is a 35 U.S.C. § 371 National Phase conversion of PCT/CA2014/000219, filed Mar. 13, 2014, which claims benefit of U.S. Provisional Application No. 61/787,410, filed Mar. 15, 2013, the disclosure of which is incorporated herein by reference. The PCT International Application was published in the English language.

FIELD OF INVENTION

This Application relates to a tool for holding an electrode, and operation thereof.

BACKGROUND OF THE INVENTION

In the manufacture of mass-produced products a production line may involve the sequential assembly of parts using a large number of welding stations. At each welding station there may be a welding tool having first and second electrodes. Welding electrodes are generally made of copper. However, the substrate material need not be limited to copper. For example, coatings of vanadium-carbide, tungsten-carbide, titanium-diboride, zirconium-diboride, Titanium-carbide, $Cr_3C_2$, and so on, might be applied to various tool steels or aluminum, or other metals, as may be. The end of the electrode generally carries a cap, which may have a size and shape suitable for making the desired weld. The cap is also typically made of copper or a copper alloy, and may be hollow. The tip of the cap will have a size and shape suitable for the objects to be welded. The welding, workpiece contacting, contact end of the cap may, at least initially, be substantially spherical, or it may have the shape of a truncated cone, or it may have some other shape. At the tip of the cap there may be a coating of some kind, be it titanium carbide or titanium di-boride, or some other coating, such as may tend to delay deterioration of the cap.

It may be helpful to have a tool for aiding in the coating of the cap. In the electro-spark deposition process, a consumable piece of electrode material is brought into contact with a metallic base surface to be treated. The surface area will be coated with a layer of the electrode material when swept by the electrode. The electrode cap may be mounted to a moving device. The condition of the contacts is dependent on the relative motion of the rod of depositing electrode coating material and the electrode cap to be coated.

SUMMARY OF INVENTION

The following summary is provided to introduce the reader to the more detailed discussion to follow. The summary is not intended to limit or define the claims.

According to an aspect of the invention there is a vibrating hand-held welding material electrode holder. In another aspect of the invention there is a ventilated hand-held welding material electrode holder. In a further aspect of the invention there is a vibrating hand-held welding material electrode holder that is internally ventilated.

In still another aspect there is an electrode holder for a welding material electrode. The holder has an handle by which an operator may grasp the electrode holder. There is an electrode seat mounted to the handle. The electrode seat defines a seat for an electrode rod. There is a power source in electrically conductive connection with the electrode seat, whereby an electrode rod received in the electrode seat may receive electrical current from the power source. A vibration source is mounted to the handle.

In a feature of any of those aspects of the invention, the handle includes a conduit for supply of a shielding gas. The shielding gas conduit may have an outlet adjacent the electrode holder. The electrode holder may have a shielding gas mantle or muffle. The shielding gas may be an inert gas such as Argon. In another feature the handle is made of an electrical insulator. In another feature, the electrode holder has a housing. The housing has a shape defining the handle. The vibration source is mounted within the housing. In a further feature, the housing has ventilation porting. In another feature, the vibration source is actively cooled by a ventilation impeller mounted within the housing. In another feature, there is a ventilation conduit mounted to the electrode holder, the ventilation conduit being positioned to deliver coolant to the electrode seat. In a still further feature, the electrode holder has a housing defining the handle; the handle is made of an electrically insulating material; the vibration source is mounted within the handle; and the ventilation conduit is carried within the housing. In another further feature, the ventilation conduit is an air pipe passing internally through the handle.

In another feature, the vibration source includes an exciter and a resilient transmitter, the electrode seat is mounted to the resilient transmitter. In another feature the transmitter is adjustably tunable. In another feature, the electrode seat has an axial direction associated with a long axis of electrode rods mounted therein, and the vibration source, in operation, oscillates the handle with a component of force in the axial direction. In still another feature, the electrode seat has an axial direction; the exciter oscillates in operation; and oscillation of the exciter includes a component of force in the axial direction. In a further feature, the exciter includes a rotating eccentric. In another feature the eccentric is adjustable. In a further feature the eccentricity is externally adjustable. In still yet another feature the resilient transmitter includes a spring mounted between the exciter and the electrode seat. In yet a further feature, the electrode seat is adjustably orientable relative to the handle. In again another feature, the electrode holder includes at least one electrical brush mounted between the power source and the electrode seat, whereby the electrode seat remains in electrically conducting relationship to the power source notwithstanding re-orientation of the electrode seat.

In another feature, there is the combination of the electrode holder and a workpiece holder, the workpiece holder being mounted to a drive. The drive is operable to move the workpiece in at least one degree of freedom of motion while an electrode rod is held in the electrode holder. The workpiece holder includes a power source of opposite polarity to the power source of the electrode holder. While the electrode rod is biased against the workpiece, the electrode holder is operable to vibrate, whereby welding material from the rod is deposited on the workpiece. In another feature of any of the foregoing aspects and features, the motor is a servo motor. In a still further feature, the motor is connected to an output shaft by a vibration control coupling or coupler. In another feature the transmission has a damper or fulcrum. In another feature the position of the damper or fulcrum is externally adjustable.

In a further aspect of the invention there is the method of using any of the apparatus having any combination of the aspects and features described herein, that method including the steps of mounting the electrode in the holder, or causing the holder to vibrate, and of placing the electrode and the work piece in contact while charged with opposite electrical polarities. There are many combinations and permutations of aspects and features. It will be understood that any of the features may be combined, as appropriate, with any of the aspects enumerated herein.

BRIEF DESCRIPTION OF THE ILLUSTRATIONS

The foregoing aspects and features of the invention may be explained and understood with the aid of the accompanying illustrations, in which:

FIG. 2 is a first side view of the electrode handle apparatus of FIG. 1;

FIG. 3 is a top view of the electrode handle of FIG. 1;

DETAILED DESCRIPTION

Figure 1:
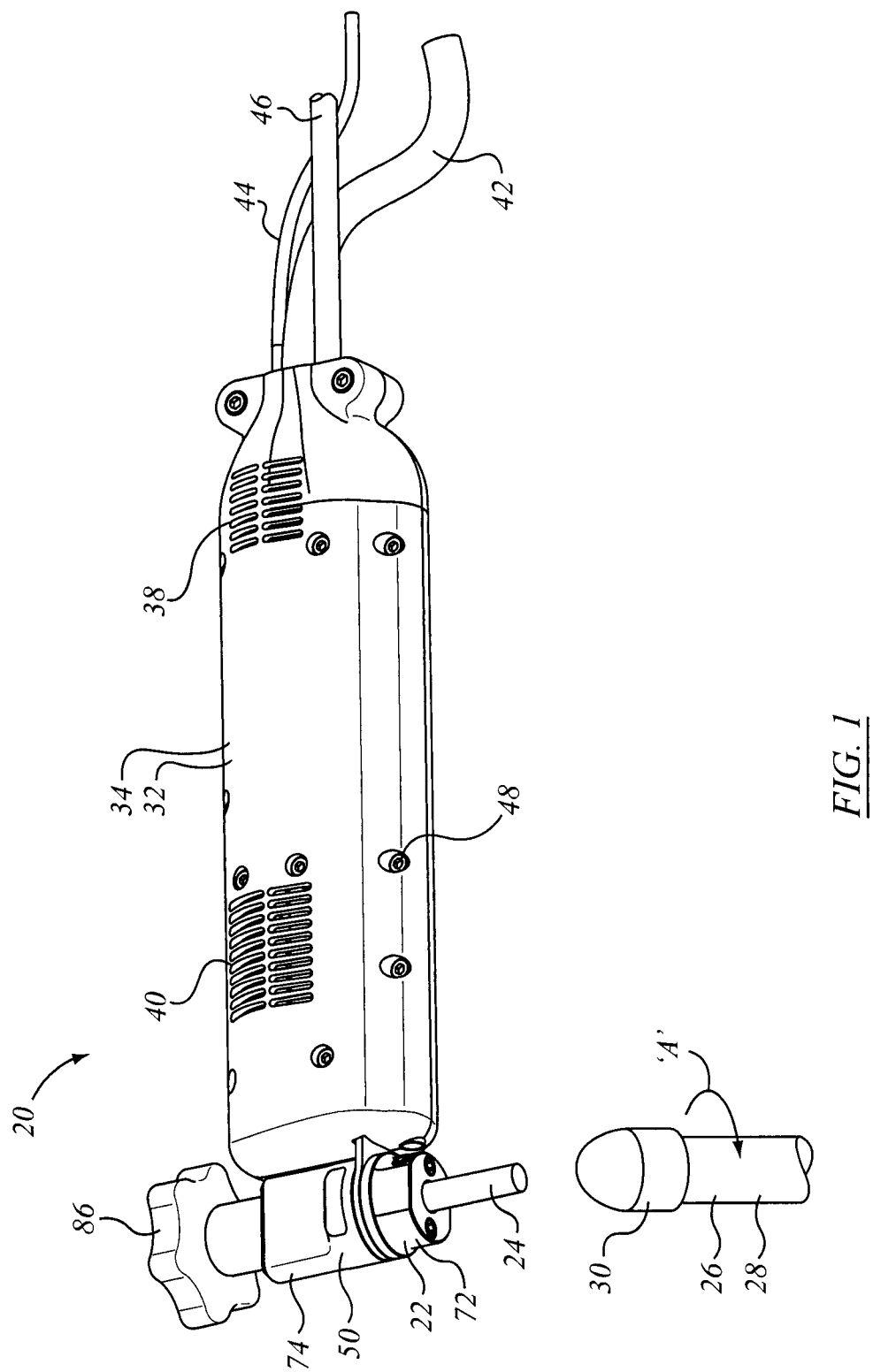
FIG. 1 is a general arrangement perspective view of an electrode handle apparatus according to an aspect of the invention herein.

The description that follows, and the embodiments described therein, are provided by way of illustration of an example, or examples, of particular embodiments of the principles of aspects and features of the invention. These examples are provided for the purposes of explanation, and not of limitation, of those principles and of the invention. In the description, like parts are marked throughout the specification and the drawings with the same respective reference numerals. The drawings may be taken as being to scale, or generally proportionate, unless indicated otherwise.

The scope of the invention herein is defined by the claims. Though the claims are supported by the description, they are not limited to any particular example or embodiment, and any claim may encompass processes or apparatuses other than the specific examples described below. Other than as indicated in the claims themselves, the claims are not limited to apparatuses or processes having all of the features of any one apparatus or process described below, or to features common to multiple or all of the apparatus described below. It is possible that an apparatus or process described below is not an embodiment of any claimed inventions.

The terminology used in this specification is thought to be consistent with the customary and ordinary meanings of those terms as they would be understood by a person of ordinary skill in the art in North America. Following from the decision of the Court of Appeal for the Federal Circuit in *Phillips v. AWH Corp.*, the Applicant expressly excludes all interpretations that are inconsistent with this specification, and, in particular, expressly excludes any interpretation of the claims or the language used in this specification such as may be made in the USPTO, or in any other Patent Office, other than those interpretations for which express support can be demonstrated in this specification or in objective evidence of record in accordance with *In re Lee*, (for example, earlier publications by persons not employed by the USPTO or any other Patent Office), demonstrating how the terms are used and understood by persons of ordinary skill in the art, or by way of expert evidence of a person or persons of experience in the art.

Reference is made herein to welding electrode tips and caps, which are intended to provide a generic example of a work piece that is movable with respect to at least one degree-of-freedom of motion while being coated. Other objects could also be coated. In respect of each tip or cap, it may be helpful to define a polar-cylindrical co-ordinate system, in which the axial, or z-direction defines the axis about which the cap or electrode tip is formed, or has a surface, on a body of revolution, the term radial refers to a distance away from the z-axis, and circumferential refers to an angular direction about the z-axis.

By way of general overview, an electrode handle apparatus, which may be referred to as a handle, is shown in FIG. 1 as 20. Apparatus 20 has an electrode holder, indicated generally as 22, in which an electrode 24 is mounted. Electrode 24 has a cylindrical shape, and is relatively long and thin. Electrode 24 may be a semi-conducting material, such as Titanium Carbide, Titanium di-boride, or such other material as may be. The outwardly extending tip of electrode 24 is seen positioned toward an object apparatus 26, which includes a mandrel 28 upon which is mounted a workpiece to be coated, such as may be a welding electrode cap 30. The mandrel, or support fitting, or jig, or fixture, upon which the workpiece is mounted has at least one degree of freedom of motion. In the example shown, the degree of freedom of motion is rotational motion about the longitudinal axis of mandrel 28, such that cap 30 is spinning, as notionally indicated by arrow 'A'. Mandrel 28 and apparatus 22 are both connected to an electrical power source, such that they are of opposite polarity. When electrode 24 is brought into contact with electrode cap 30, electric current will flow between the two. Inasmuch as current flow is initiated by a spark as the two parts come into proximity, and inasmuch as both parts are moving, contact may be intermittent, and at each contact a portion of electrode 24 may melt or otherwise be deposited upon cap 30. As cap 30 spins and electrode 24 makes and breaks contact, the top of cap 30 becomes coated with the electrode material. Cap 30 may be a copper cap, it may have a first coating of nickel, and the TiC or $TiB_2$, or other coating material, may be laid down on top of the nickel. Handle apparatus 20 may be a vibrating apparatus, such that the tendency to make and break contact with the object workpiece is enhanced.

Figure 6:
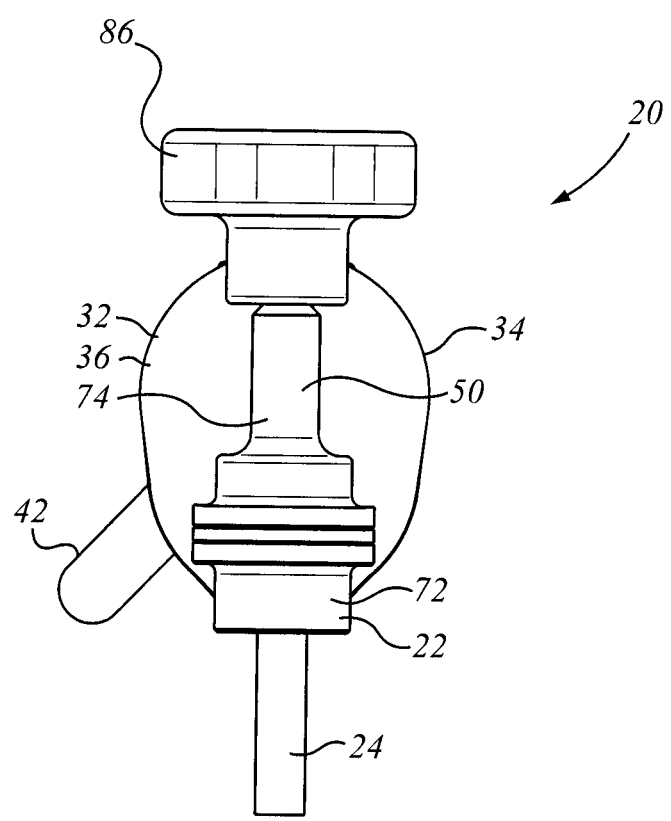
FIG. 6 is an end view of the electrode handle apparatus of FIG. 1.

Considering again apparatus 20, there is housing, or backshell, or haft, or body generally indicated as 32, that housing including first and second portions 34, 36, which may be referred to as backshell halves. First and second housing portions 34, 36 are held together by an array of fasteners such as may be in the nature of threaded cap screws 48. Both backshell halves may have porting in then nature of vents such as inlet vent array 38 and outlet vent array 40, by which air or other coolant may be admitted to, and enabled to depart from, the interior of housing 32. The backshell halves may be made of an electrically non-conductive, or electrically insulating, material. The girth of housing 32 may be suitable for being grasped in the hand of an operator. Although not necessarily circular in section, as seen in FIG. 6, the general proportions of housing 32 are that it may have a through dimension of the order of 2 inches.

At the connected end, housing 32 has three input connections, the first input being an electrode power connection, which may be a DC power connection, indicated as 42, and which may, ultimately, be connected to a power source—the same power source of which the opposite pole is connected to mandrel 28. The second input is a motor power source 44 for operation of an electric motor within housing 32, in the form of a power cable which may be 120V AC 60 Hz, or 220 V AC 50 Hz, or a 12V DC source, or such other source as may be, and could be a pneumatic source. The third input is a cooling line 46, such as may be an air line. At the free end of housing 32 (i.e., the end distant from the three connection inputs) is the tool holder assembly, indicated generally as 50, and described in greater detail below.

Figure 4:
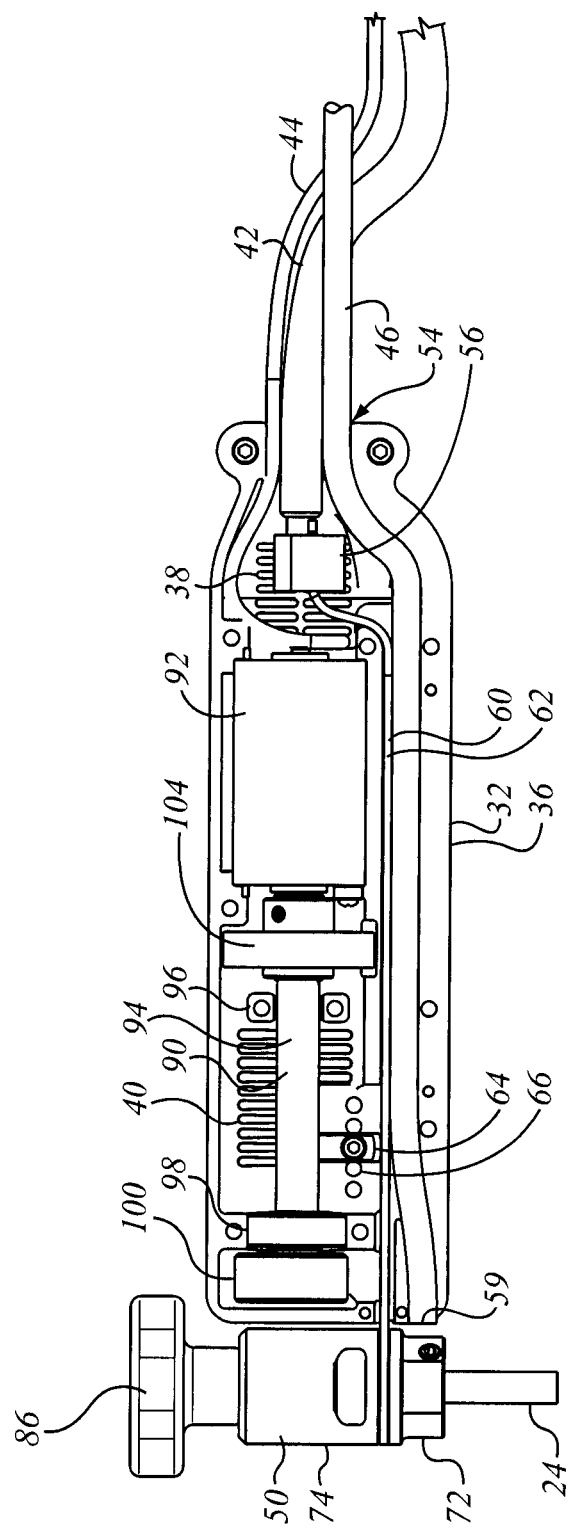
FIG. 4 is a side view of the electrode handle of FIG. 2 with the near-side handle haft removed to expose interior features.
Figure 5:
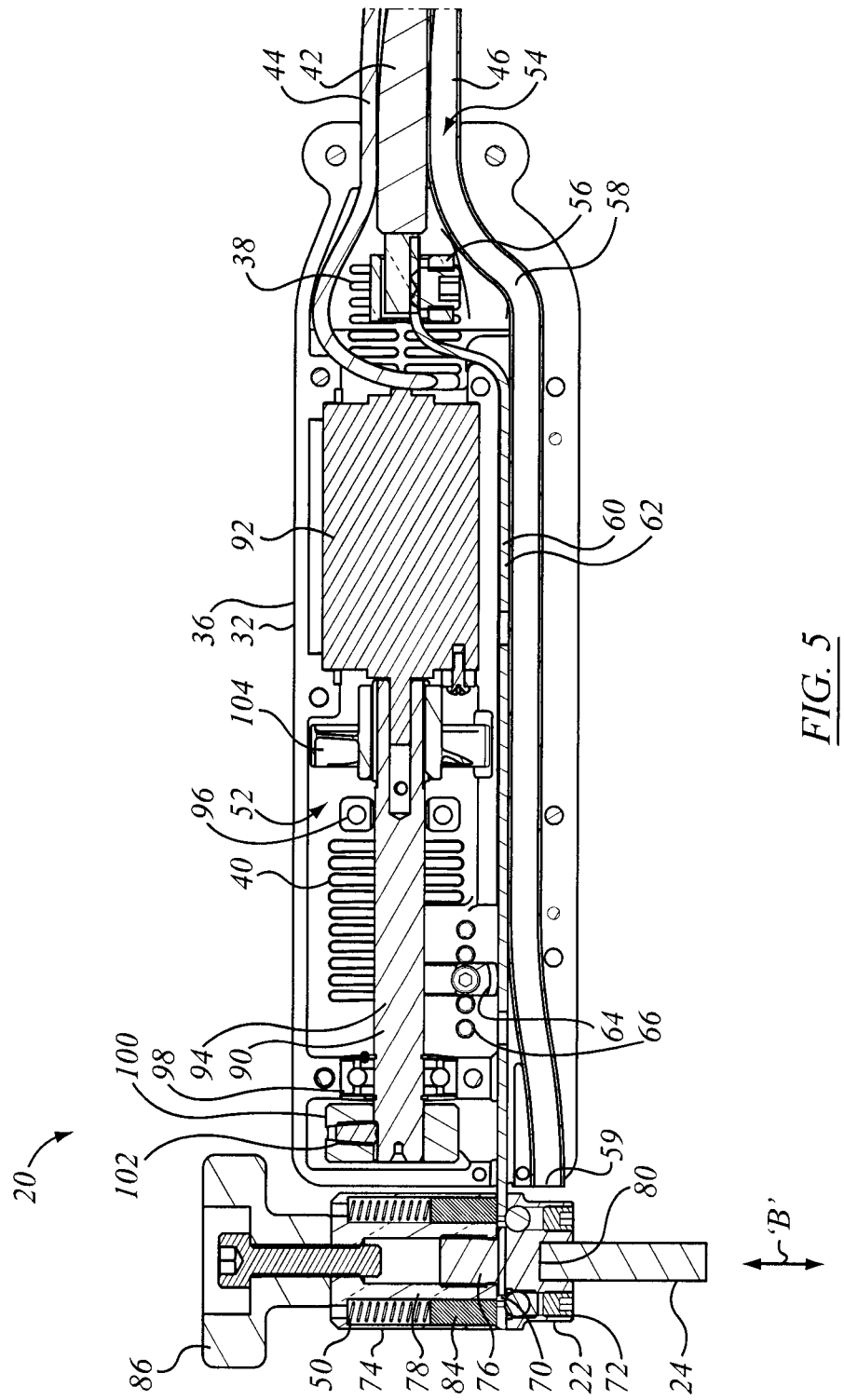
FIG. 5 is a longitudinal cross-sectional view of the electrode handle of FIG. 2.

Considering FIGS. 4 and 5, an internal machinery space 52 is defined within the two halves or portions 34, 36 of housing 32. The inputs pass into housing 32 at an opening 54. Opening 54 may be located at the first end of housing 32. It may be that roughly half of each opening is formed in each portion of the housing, the perimeter of the opening being closed together when the halves are assembled. There could, alternatively, be a separate opening for each input as may be, and such an opening or penetration could be formed entirely in one half the shell. The main power cable, namely that of electrode power connection 42 is secured at a terminal lug 56 inside housing 32, adjacent to opening 54. The coolant conduit may have the form of a hollow pipe 58 that is formed to run along the inside proximal margin of housing 32, with an outlet 59 oriented toward tool holder assembly 50 adjacent the seat of electrode 24. Coolant conduit 58 may be used to carry air as a cooling fluid, or, alternatively, it may be used to conduct an inert gas, such as argon, to electrode rod 24, and, whether used for cooling or not, may be used for the alternate purpose of providing an inert gas shielding to the coating process. That portion of pipe 58 lying outside of opening 54 may be made of a non-electrically conductive material such as a plastic tube. That portion of pipe 58 lying within housing 32 may be made of a metal, such as copper, aluminum, stainless steel, mild steel, or such other metal as may be suitable, those metals tending to have higher thermal conductivity than plastic pipe.

Also connected at terminal lug 56 is a predominantly lengthwise-extending member defining a transmission 60. Tool holder assembly 50 is mounted to the far end of transmission 60. Transmission 60 may have the form of a lever or spring or beam 62. The first end of the spring or beam is secured at terminal lug 56, as indicated. The main or medial portion of transmission 60 may lie next alongside pipe 58 and may be contained between pipe 58 and a fulcrum 62 located intermediate the first and second ends of transmission 60. In the embodiment illustrated, fulcrum 64 is located closer to tool holder assembly 50 than to lug 56. The position of fulcrum 64 is adjustable according to the various positions of an array of mounting fittings, which may be threaded blind sockets, indicated generally as 66. If the length of transmission 60 from the center of lug 56 to the axial centerline of tool holder assembly 50 is designated as "L", the position of fulcrum 64 may be in the range of about ⅗-⅘ of length L from lug 56 to tool holder 50. That portion of transmission 60 lying beyond fulcrum 62, i.e., between fulcrum 62 and tool holder 50, is a cantilever. Tool holder 50 acts as a concentrated mass at the end of the cantilever. As may be understood, transmission 60 so restrained has a configuration like a spring-board or diving board.

Tool holder assembly 50 includes a first portion 72, and a second portion 74. The distal end of transmission 60 has an aperture formed therethrough such that the male portion 76 of first portion 72 can mate with the female portion 78 of second portion 74, with the end of transmission member 60 sandwiched therebetween. It is arbitrary which of portions 74 and 76 is male and which is female, the parts are joined in a connection. As mated together, tool holder 50 is rotatable about its long axis to permit electrode 24 to be turned. First portion 72 may be a locking socket or chuck defining the seat 80 for electrode 24, and may have tightening or securing members, such as a grub screw 82. Second portion 74 includes spring biased graphite brushes 84. A handle 86 is mounted to second portion 74, the handle having an appropriate grip by which it may be turned, such as by a person wearing gloves. Handle 86 may be made of an electrically insulating material, such as a cast plastic. First portion 72 and second portion 74 are both electrically conductive, and may be made of copper or a copper alloy. Consequently an electrically conductive path is completed from electrical power connection 42 through transmission 60, through brushes 84, through second portion 74 and first portion 72, and into electrode 24.

Also enclosed within housing 32 is a vibration assembly, or an oscillator, or shaker, such as may be identified as 90. It may include a motor 92, which may be an electrical motor connected to motor power source 44. Motor 92 may drive an output shaft 94 that passes through near and far bearings 96, 98. An eccentric 100 is mounted to shaft 94, such as at the distant end thereof. Eccentric 100 may be a disc with either an unbalanced weight or an unbalanced cavity indicated at 102, such that when shaft 94 rotates, assembly 90 vibrates. The resultant vibration has an amplitude having a component in the axial direction of electrode rod 24. As may be noted, an air moving device, such as a fan blade, or impeller 104 is mounted to shaft 94, and, as shaft 94 turns impeller 104 draws air in through inlet vent array 38, and urges it out through outlet vent array 40. In an alternate embodiment, the direction of the airflow may be in the opposite direction.

In use, an operator grasps housing 32, and uses electrode 24 much like a pencil to paint or coat the work piece object. While this is occurring, the rotation of eccentric 100 causes apparatus 20 to vibrate, which, in turn, causes electrode 24 rapidly and repeatedly to make and break contact with the work piece. With each oscillation there is a new spark and deposition of the material of electrode rod 24 onto the work piece.

Vibration assembly 90 provides a forcing function as the input of transmission 60, which is not merely an electrical conductor, but also a mechanical conductor in terms of transmitting an input impulse, or wave-train of impulses. The force and displacement transmissibility of transmission 60 to electrode holder 50 is dependent upon the natural frequency of that assembly in the axial direction of electrode 24, that direction being the same direction as the dominant vibration mode of the spring board or beam of transmission 60 as it flexes outboard of fulcrum 64.

Although the axis of the cylindrical rod of electrode 24 is shown as being perpendicular to the long axis of apparatus 20. This need not necessarily be. In another embodiment, electrode 24 may have the form of a rod having an axis parallel to, or concentric with, the main body of housing 32.

As shown and described herein, the handle apparatus is a device that drives the consumable electrode 24 to vibrate in a first degree of freedom of motion in longitudinal or predominantly longitudinal movement (i.e., having a component of motion, possibly a predominant component of motion in the direction of the longitudinal axis of the electrode rod) relative to the metallic surface being coated or treated in the process. The longitudinal force or displacement is generated by attaching an eccentric circular metal load to a spinning motor. The positioning of the eccentric weight determines the pounding or contact force when the contacts are made. The frequency of vibration is controlled with the speed of the motor to which the eccentric weight is mounted, and also by the placement of the fulcrum. The longitudinal movement of the consumable electrode in a direction that includes a component of motion, and usually a predominant component of motion, normal to the surface to be treated, allows the periodic and consistent contacts to be made with the metallic surface. This occurs while that surface is being driven in a second degree of freedom of motion. The combination of motions, and the vibration driven urge to make and break contact, may result in a relatively stable or consistent sequence of electro-sparks (when the contacts open) and depositions of coating material (when the contacts close) that take place in the process. In the process described, the vibrating motion is, or includes, motion normal to the surface being coated, and occurs at the same time as the surface is being moved in another degree of freedom, e.g., as by rotating about an axis, or by translational movement relative to the normal direction, such as to bring a "fresh" portion of the work piece under the coating rod.

This process may be compared with a known process in which only the work-piece is moving, e.g., by rotation, and the coating electrode rod is held against the surface, or in which the work-piece is stationary, and the electrode rod is spinning about its axis. The coating material tends to be much harder than the copper or other material being coated (which, if copper, may itself have a nickel overlay). The grinding effect of the hard coating material may tend to remove the soft material in the ESD process, including a fair portion of the previously deposited coating material that one might wish to retain. Such a process may not be as efficient as might be desired. The vibrating motion normal to the surface may tend to facilitate relative translation of the workpiece between electrosparks, possibly without the same grinding effect, and perhaps with a greater output yield for a given quantity of coating rod consumed.

Figure 7:
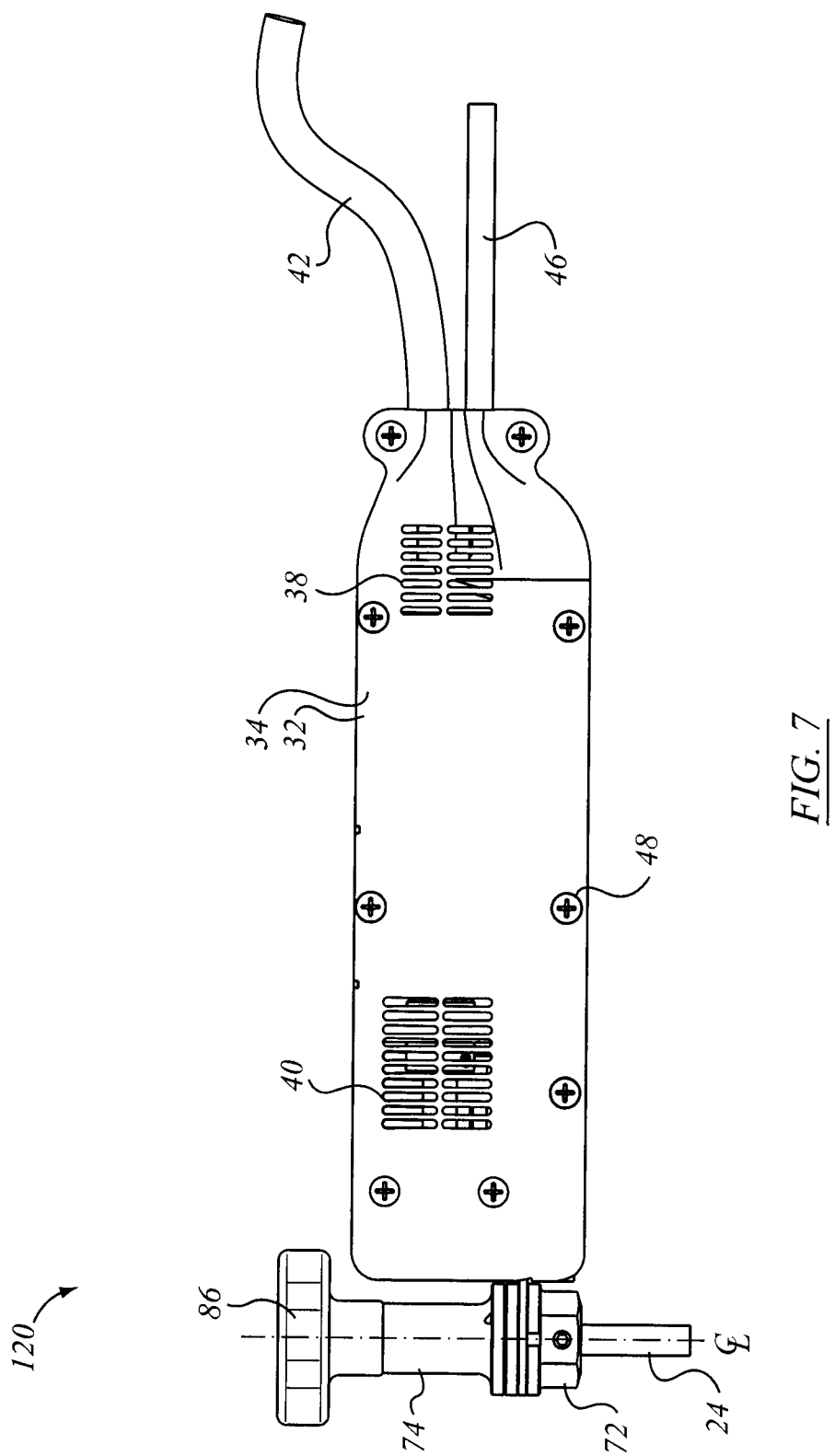
FIG. 7 is a side view of an alternate embodiment of electrode handle to that of FIG. 1.
Figure 8:
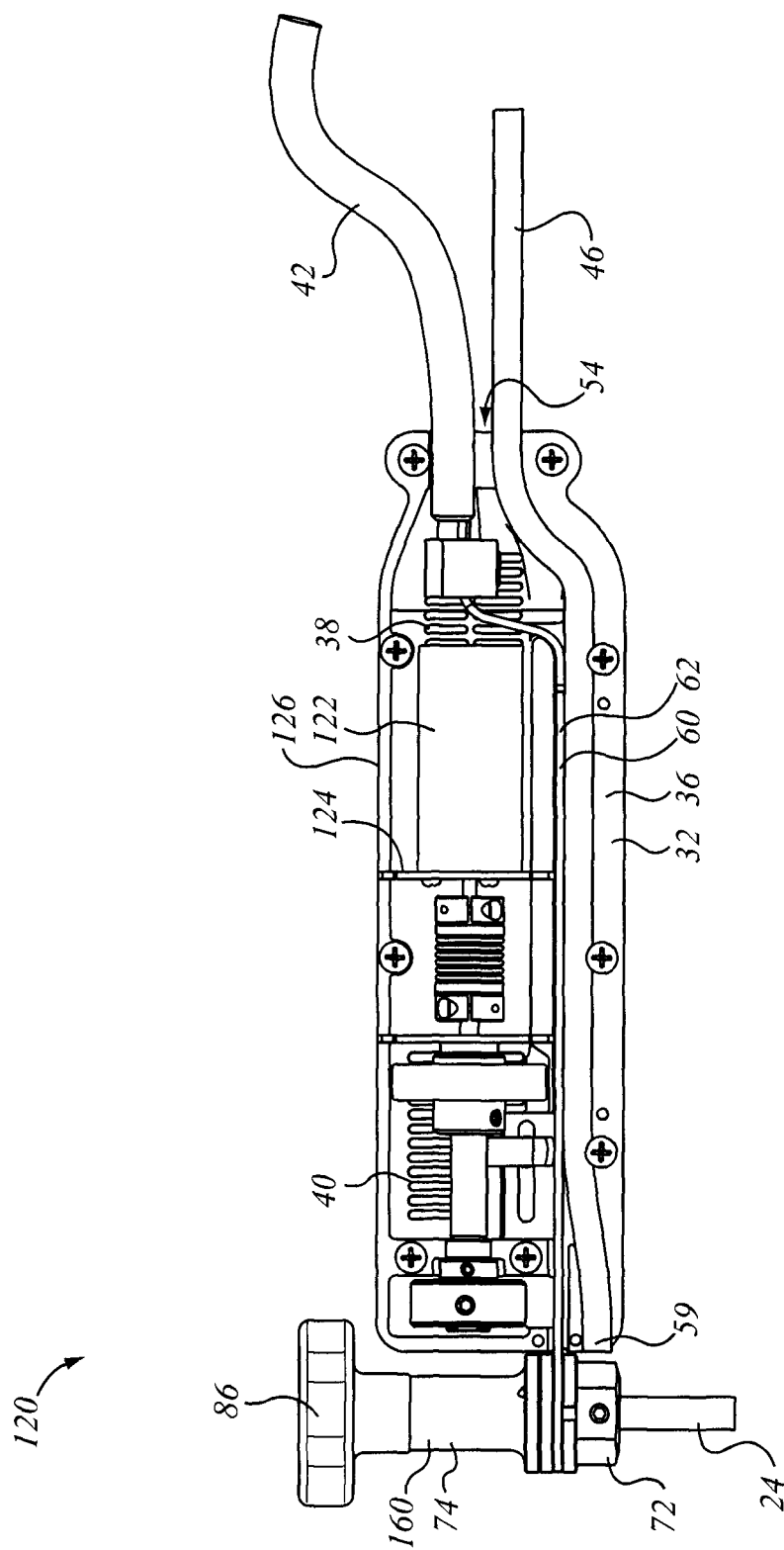
FIG. 8 shows the electrode handle of FIG. 7 with the near side of the housing removed.
Figure 9:
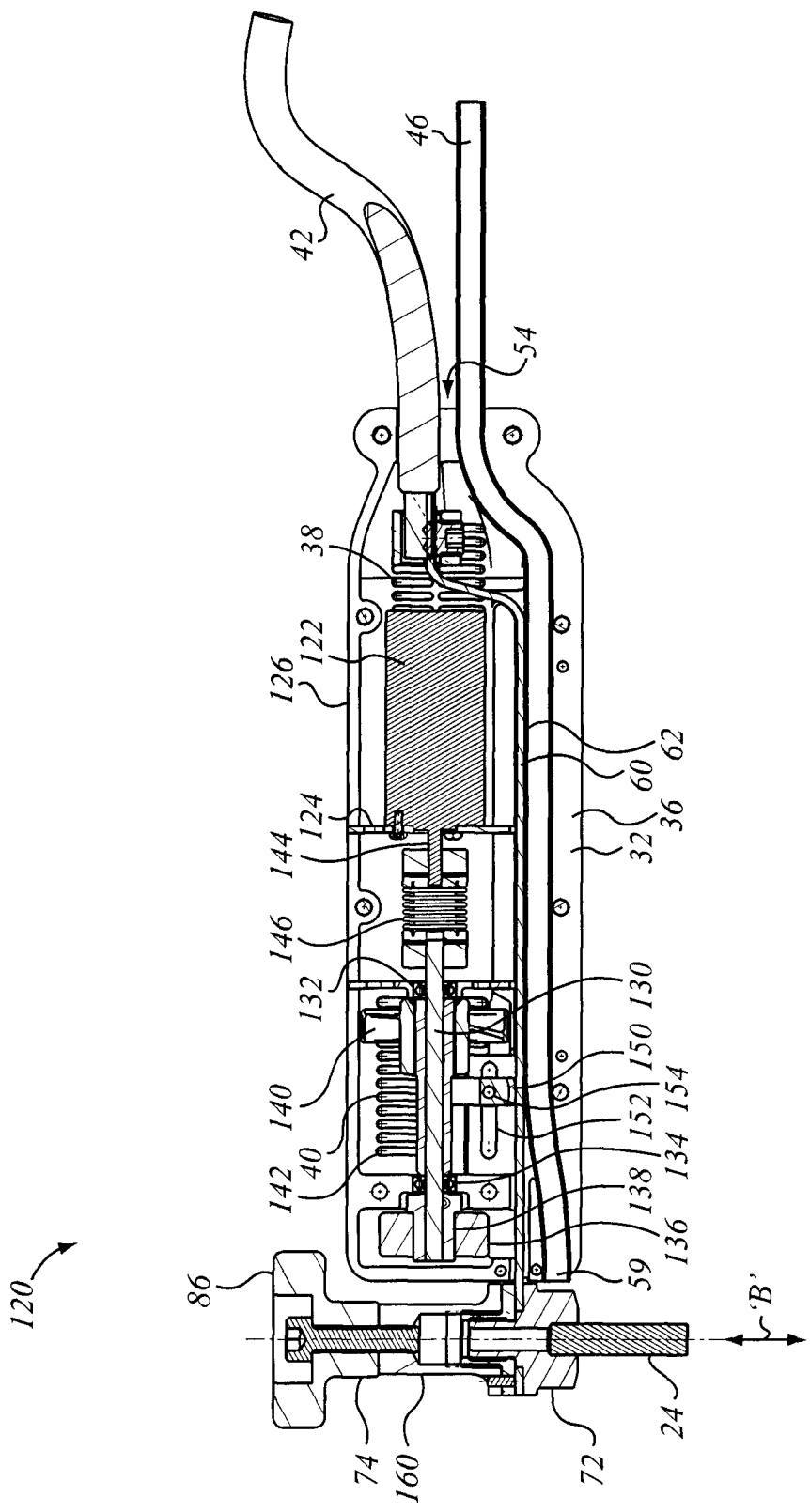
FIG. 9 shown a cross-section of the electrode handle of FIG. 7 along its longitudinal central plane.
Figure 10:
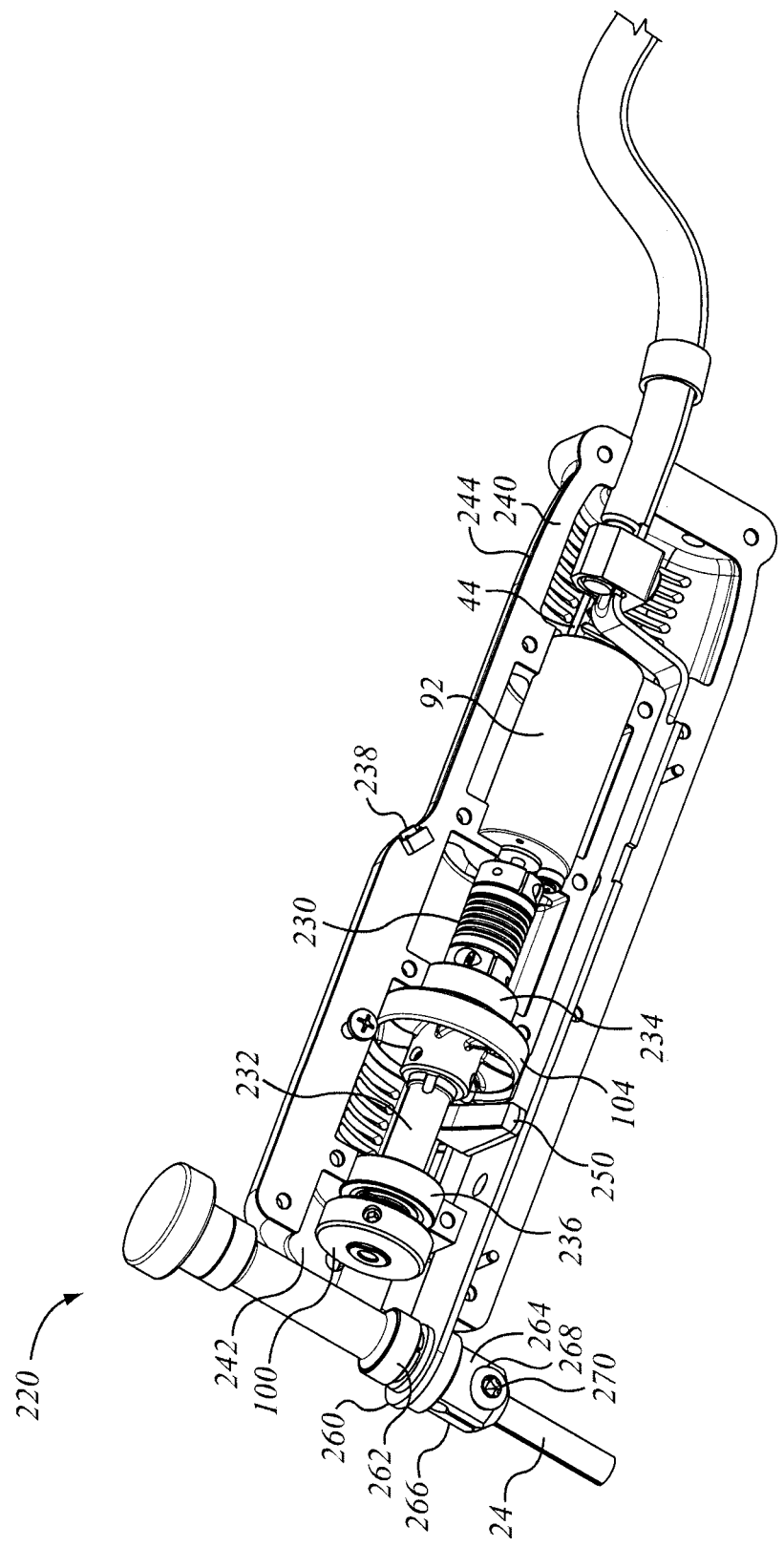
FIG. 10 shows a general arrangement perspective view of an alternate electrode handle apparatus to that of FIG. 1.
Figure 11:
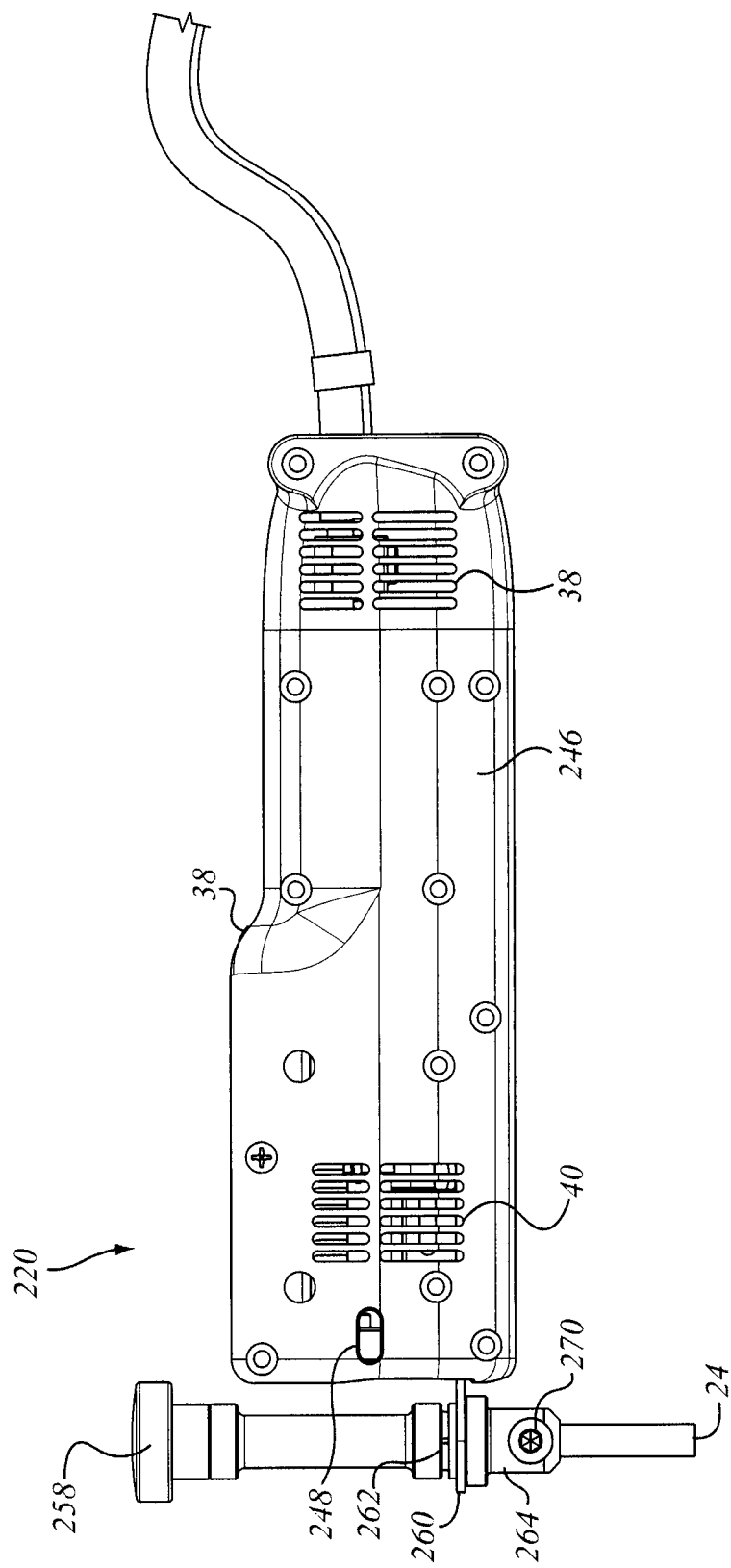
FIG. 11 is a first side view of the electrode handle apparatus of FIG. 10.
Figure 12:
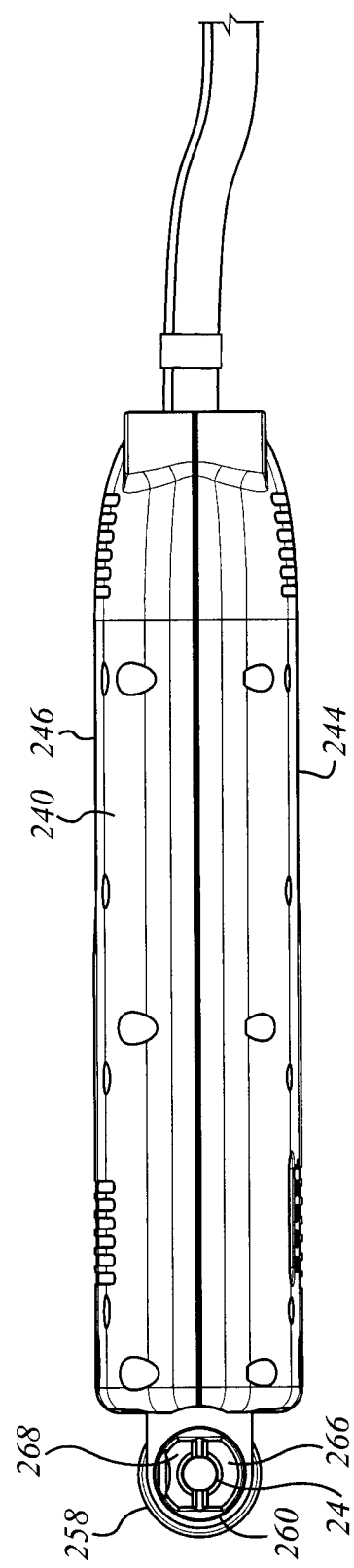
FIG. 12 is a bottom view of the electrode handle of FIG. 10.

The embodiment of electrode handle apparatus 120 of FIGS. 7-9 is substantially similar to the embodiment of electrode handle apparatus 20 of FIGS. 1-6, and, to the extent applicable, common parts are identified by common part numbers. Apparatus 120 differs from apparatus 20 to the extent of employing servo motor 122 carried on a motor mount 124 seated in housing 126. As may be understood, servo motor 122 is a variable speed motor. A separate shaft 130 is carried in a first, or mid-position bearing 132 and a second or distant position bearing, or pilot bearing 134. A counter weight 136 and counterweight adapter 138 are mounted on the distal end of shaft 130 (i.e., the end distant from motor 122). An impeller 140 and impeller adapter 142 are mounted to shaft 130 between the front and mid bearings (i.e., bearings 134 and 132). The proximal end of shaft 130 is connected to the output shaft 144 of motor 122 by a flexible coupling 146. Flexible coupling 146 may tend to isolate motor 122 from radial loads on shaft 130.

Further, apparatus 120 has a movable fulcrum 150 that is externally accessible, and adjustable by means of access slot 152 and set screw 154. As previously, the ability to move fulcrum 150 longitudinally toward tool holder assembly 160 may tend to permit the cantilevered portion of transmission 60 to be choked down, both by shortening the length of the cantilever, and by constraining its lateral motion. Fulcrum 150 may, in that sense be said to choke down, or damp down, the amplitude of vibration of tool holder assembly 160 in direction namely the axial direction of rod 24.

An alternate electrode handle apparatus 220 is shown in FIGS. 10-14. Apparatus 220 may be taken as being the same, or substantially the same as apparatus 20, to the extent that similar parts may be indicated with the same item numbers, and the foregoing description may be taken to apply to the features of apparatus 220.

Apparatus 220 differs from apparatus 20 in a number of features. As a number of preliminary points, although apparatus 220 does not show a third input, namely cooling line 46, it may be understood that apparatus 220 may include such a line in other embodiments. Electrical power connection line 44, feeding electrical power from a power source to motor 92 is also not visible in FIGS. 10-14, notwithstanding that apparatus 220 does have an electrical power source for motor 44. As may be seen apparatus 220 includes a clutch or damper 230. Damper 230 may include a spring or resilient member such as may tend to provide a dynamic filter between motor 44 and the eccentric weight 100. Damper 230 is mounted to the output shaft of motor 44. Driven shaft 232 is connected to, and extends from damper 230 to an impeller 104, and, in turn, to eccentric weight 100. As motor 44 turns, impeller 104 draws ventilating air through inlet apertures or vents or ports 38, across motor 44, and forces it out exhaust ports 40. Driven shaft 232 is carried in front and rear bearings 234 (axially near motor 44) and 236 (axially more distant from motor 44), with eccentric weight 100 being mounted axially outboard of bearing 236. The axial spacing of bearings 234 and 236 may tend to provide a long moment arm, and may tend to aid in resolving the eccentric imbalance into the housing, or housing body, 240 through bearings 234 and 236 rather than through the bearings of motor 44. Motor 44 may have an on-off switch or speed control as shown on the dorsal portion of apparatus 220 at 238.

Housing body 240 may be open at the head or front end, (i.e., the end nearest electrode 24) as at 242. Housing body 240 may have left and right hand parts of halves 244, 246, that fit together, as above, and that may have indexing pins and blind sockets for that purpose. One or the other of halves 244, 246 may include an access port or keyway 248 through which a tool, such as a screw driver, socket, wrench, or Allen key, may be introduced to tighten or loosen the securing fastener, such as a grub screw, of eccentric weight 100. To the extent that end 242 is open, eccentric weight 100 may then be removed or replaced, as may be desired or suitable for the speed of operation such as may be set or adjusted with control 238.

Figure 13:
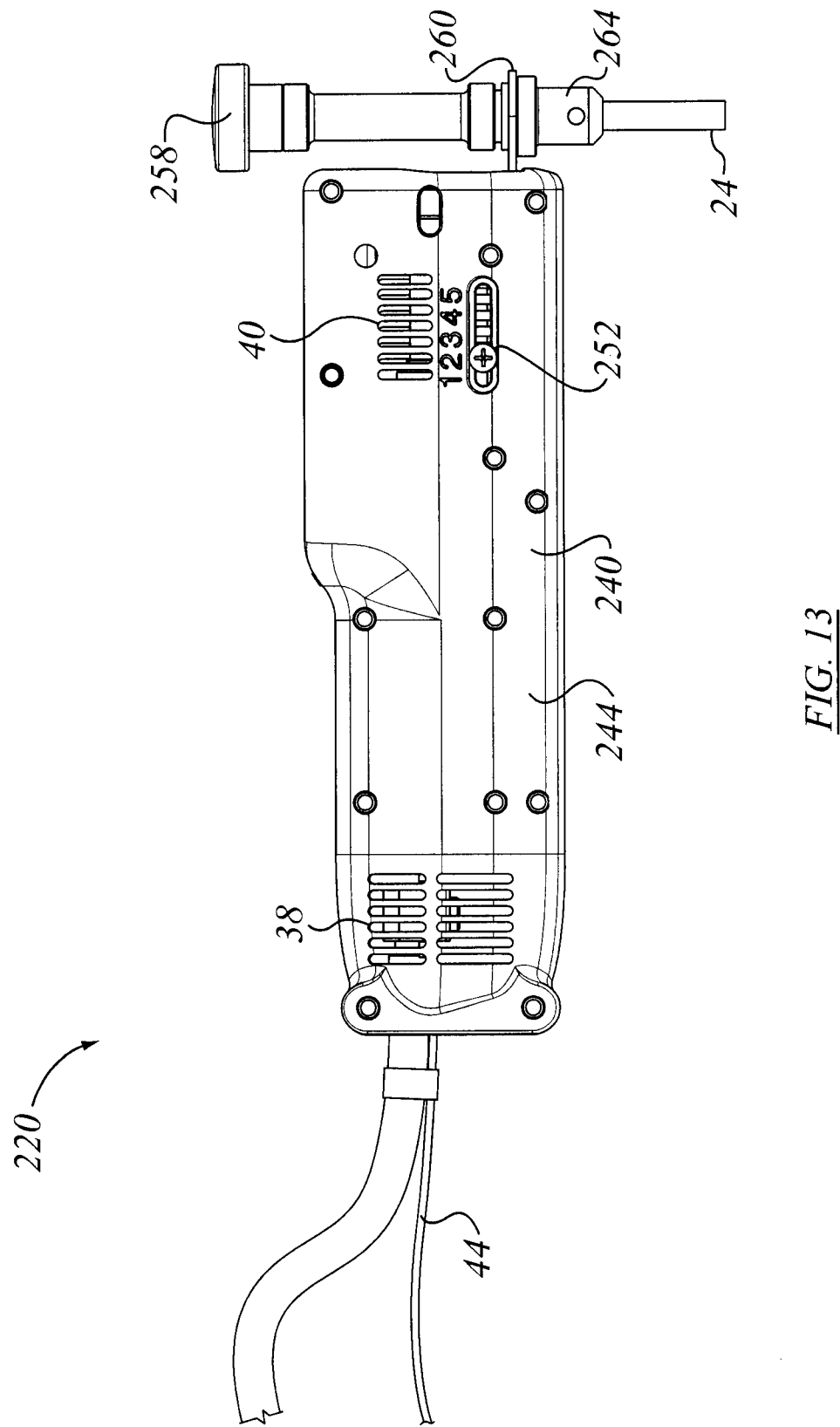
FIG. 13 is an opposite side view to that of FIG. 11.
Figure 14:
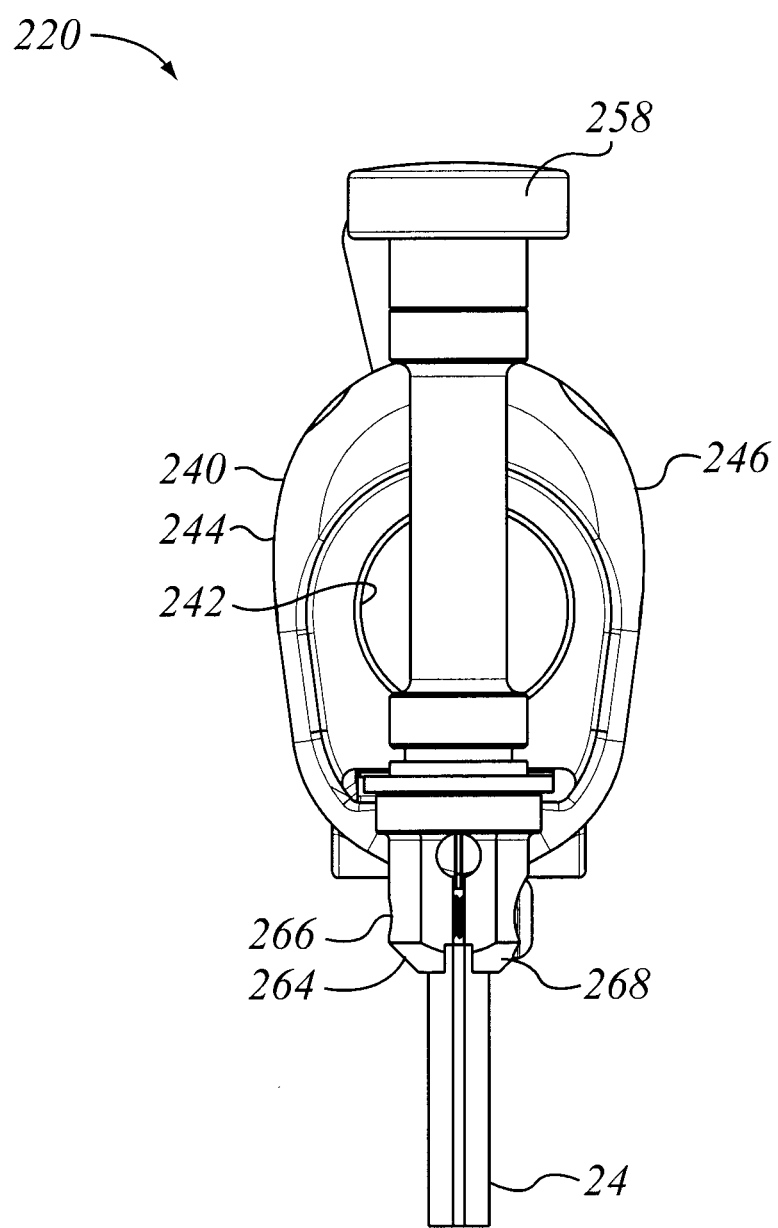
FIG. 14 is a head end view of the apparatus of FIG. 10.

Further, apparatus 220 may include an externally adjustable fulcrum, or seat, or snubber, or damper 250 that, when secured, bears against the motion transmitting member to which electrode 24 is mounted, such as spring 62. In essence, damper 250 functions as a guitar fret, changing the natural frequency of cantilever of spring 62, and also as an amplitude limiting device, to the extent that damper 250 confines spring 62. Damper 250 may include a rubber (or other polymer or elastomer) body, and may have a wedge shape. The fastener 252 of damper 250, and its range of adjustable locations, is seen in FIG. 13.

Further still, apparatus 220 includes a different electrode holding fitting or seat, 260. While handle 258 may still be rotated about its longitudinal axis by virtue of its rotatable mounting 262 to spring 62, a split collar 264 has left and right jaws 266, 268 that seize upon the end of electrode 24, and are secured by a chuck, or lock, or lateral fastener 270. The jaws of apparatus 220 may tend to hold a smaller portion of rod 24 than the fitting of apparatus 20, thus tending to reduce the wastage of the expensive sintered coating composition rods.

What has been described above has been intended illustrative and non-limiting and it will be understood by persons skilled in the art that other combinations of the features described above, and modifications, may be made without departing from the scope of the disclosure as defined in the claims appended hereto. Various embodiments of the invention have been described in detail. Since changes in and or additions to the above-described best mode may be made without departing from those aspects, the invention is not to be limited to those details but only by the appended claims.

I claim:

1. An electrode holder for a consumable welding material electrode, said electrode holder comprising:
   a handle by which an operator grasps said electrode holder;
   said handle being made of an electrical insulator;
   an electrode seat for a consumable welding material electrode rod, said electrode seat being mounted to said handle;
   said electrode holder has a housing, said housing having a shape defining said handle;
   an electrically conductive member mounted to said handle, said electrically conductive member having a first end at which to receive power from an electrical power source, and a second end in electrically conductive connection with said electrode seat, in use, said electrically conductive member being operable to carry electrical current from said power source to melt the electrode rod;
   a vibration source mounted to said handle, said vibration source being operable to vibrate said electrode seat relative to said handle;
   said vibration source being mounted within said housing, said vibration source includes an exciter; and said exciter includes a rotating eccentric;
   said electrically conductive member is a beam;
   said rotating eccentric is mounted to a shaft beside said beam; and
   said beam conducts both electricity and vibration to said electrode seat.

2. The electrode holder of claim 1 wherein said housing has ventilation porting.

3. The electrode holder of claim 1 wherein said vibration source is actively cooled by a ventilation impeller mounted within said housing.

4. The electrode holder of claim 1, including a member adjustably positionable to constrain vibration amplitude of said electrode seat.

5. The electrode holder of claim 1 wherein said electrode seat has an axial direction associated with a long axis of a consumable welding material electrode rod mounted therein, and said vibration source, in operation, oscillates said electrode seat with a component of force in said axial direction.

6. The electrode holder of claim 1, further comprising: a workpiece holder, said workpiece holder being mounted to a drive, said drive being operable to move said workpiece holder in at least one degree of freedom of motion while said consumable welding material electrode rod is held in said electrode holder, said workpiece holder including a connection of opposite polarity to said electrical power source of said electrode holder; and while said consumable welding material electrode rod is biased against a workpiece, said electrode holder being operable to vibrate, whereby welding material from said consumable welding material electrode rod is deposited on said workpiece.

7. An electrode holder for a consumable welding material electrode, said electrode holder comprising:
   a handle by which an operator grasps said electrode holder;
   said handle being made of an electrical insulator;
   an electrode seat for a consumable welding material electrode rod, said electrode seat being mounted to said handle;
   said electrode holder has a housing, said housing having a shape defining said handle;
   an electrically conductive member mounted to said handle, said electrically conductive member having a first end at which to receive power from an electrical power source, and a second end in electrically conductive connection with said electrode seat in use, said electrically conductive member being operable to carry electrical current from said power source to melt the electrode rod;
   a vibration source mounted to said handle, said vibration source being operable to vibrate said electrode seat relative to said handle; and
   said vibration source being mounted within said housing, said vibration source includes an exciter; and said exciter includes a rotating eccentric;
   said electrode seat has a vibratory degree of freedom of motion relative to said handle;
   said electrode holder has a mechanical transmitter by which said vibration source is connected to said electrode seat; and
   said mechanical transmitter includes said electrically conductive member and said mechanical transmitter conveys vibration from said rotating eccentric and electrical current to said electrode seat.

8. The electrode holder of claim 7, wherein a ventilation conduit is mounted to said electrode holder, said ventilation conduit being positioned to deliver coolant to said electrode seat.

9. The electrode holder of claim 7 wherein said mechanical transmitter is a resilient mechanical transmitter, and said electrode seat is mounted to said resilient transmitter.

10. The electrode holder of claim 7 wherein said mechanical transmitter is adjustably tunable.

11. The electrode holder of claim 7, wherein said electrode seat has an axial direction; said exciter oscillates in operation; and oscillation of said exciter includes a component of force in said axial direction.

12. The electrode holder of claim 7, wherein said mechanical transmitter includes a spring mounted between said exciter and said electrode seat.

13. The electrode holder of claim 7, wherein said electrode seat is adjustably orientable relative to said handle.

14. The electrode holder of claim 7, wherein said mechanical transmitter includes a beam and a fulcrum, said beam being cantilevered beyond said fulcrum; and said exciter includes a motor, said motor having a shaft offset from said beam.

15. The electrode holder of claim 8, wherein said electrically conductive member is a beam; said rotating eccentric is mounted to a shaft beside said beam; and said beam conducts both electricity and vibration to said electrode seat.

16. The electrode holder of claim 8 wherein said ventilation conduit is an air pipe passing internally through said housing.

17. The electrode holder of claim 13, wherein said electrode holder includes at least one electrical brush mounted between said electrical power source and said electrode seat, whereby said electrode seat remains in electrically conducting relationship to said electrical power source notwithstanding re-orientation of said electrode seat.

18. An electrode holder for a consumable welding material electrode, said electrode holder comprising:
 a handle by which an operator may grasp said electrode holder;
 said handle being made of an electrical insulator;
 an electrode seat for a consumable welding material electrode rod, said electrode seat being mounted to said handle;
 said electrode holder has a housing, said housing having a shape defining said handle;
 an electrically conductive member mounted to said handle, said electrically conductive member having a first end at which to receive power from an electrical power source, and a second end in electrically conductive connection with said electrode seat, in use, said electrically conductive member being operable to carry electrical current from said power source to melt the electrode rod;
 a vibration source mounted to said handle, said vibration source being operable to vibrate said electrode seat relative to said handle;
 said vibration source being mounted within said housing, said vibration source includes an exciter; and said exciter includes a rotating eccentric;
 said electrically conductive member is a beam mounted within said housing;
 said beam extending as a cantilever beyond a fulcrum;
 said rotating eccentric being mounted to a shaft driven by a motor, said motor being mounted within said housing;
 said motor being and said shaft being offset from said beam;
 said housing being vented; and
 said motor driving an air moving impeller, in operation said air moving impeller operating to drive air flow through said vented housing.

\* \* \* \* \*